United States Patent
Westphal et al.

(10) Patent No.: US 9,044,042 B2
(45) Date of Patent: Jun. 2, 2015

(54) METHODS OF MAKING READY TO EAT OATMEAL PRODUCT

(75) Inventors: Kathy Westphal, San Luis Obispo, CA (US); Peter Mattson, Hillsborough, CA (US); Steven Gundrum, Redwood City, CA (US)

(73) Assignee: SENECA FOODS CORPORATION, Marion, NY (US)

( * ) Notice: Subject to any disclaimer, the term of this patent is extended or adjusted under 35 U.S.C. 154(b) by 693 days.

(21) Appl. No.: 12/805,950

(22) Filed: Aug. 25, 2010

(65) Prior Publication Data

US 2011/0052782 A1 Mar. 3, 2011

Related U.S. Application Data

(60) Provisional application No. 61/272,187, filed on Aug. 28, 2009.

(51) Int. Cl.
*A23L 1/00* (2006.01)
*A23L 1/168* (2006.01)

(52) U.S. Cl.
CPC ...................................... *A23L 1/168* (2013.01)

(58) Field of Classification Search
CPC ...................................................... A23L 1/168
USPC ........................................................ 426/619
See application file for complete search history.

(56) References Cited

U.S. PATENT DOCUMENTS

| 5,035,913 | A * | 7/1991 | Sky | 426/619 |
| 2005/0053713 | A1 * | 3/2005 | Birch et al. | 426/614 |
| 2006/0286226 | A1 * | 12/2006 | Hong et al. | 426/326 |
| 2007/0248741 | A1 * | 10/2007 | Foster et al. | 426/620 |

OTHER PUBLICATIONS

Food and Drug Administration HHS 21 CFR 101.83 pp. 151.*
Food and Drug Administration HHS 21 CFR 101.83 pp. 151, Jul. 21, 2005.*

* cited by examiner

*Primary Examiner* — Michele L Jacobson
*Assistant Examiner* — Subbalakshmi Prakash
(74) *Attorney, Agent, or Firm* — Nixon & Vanderhye, PC

(57) ABSTRACT

A method of producing a ready to eat oatmeal product for consumption in a container of a desired size. A mixture of acid, salt, fruit juice concentrate, sweetener and water are added to a processing receptacle and heated and agitated at a predetermined temperature for a predetermined time period. A selected amount of thick cut oats and the heated and agitated mixture are added to the container. The container is then sealed, pasteurized and cooled to ambient temperature. A fruit may be added to the container before it is sealed. A flavor and/or plant sterol may be added to the processing receptacle before the mixture is heated and agitated.

22 Claims, No Drawings

METHODS OF MAKING READY TO EAT OATMEAL PRODUCT

CROSS-REFERENCES TO RELATED APPLICATIONS

This application claims the priority of the Provisional Patent Application Ser. No. 61/272,187, filed on Aug. 28, 2009.

BACKGROUND OF THE INVENTION

1. Field of the Invention

The present invention relates to a ready to eat oatmeal product and, more particularly, to methods of making such a product that is fruit based and can be sold in a cup-like container, jar or the like that does not have to be refrigerated.

2. Description of the Background Art

Previous attempts to prepare and sell a ready to eat, unrefrigerated oatmeal product have for the most part been unsuccessful for one or more of the following reasons:

1. The manufacturing process has been complicated or costly; and/or

2. High heat and pressure have been required to kill bacteria which has resulted in a deterioration of the eating quality of the oatmeal; and/or 3. The processing of the oats has resulted in their deterioration with respect to substance and eating quality; and/or 4. The overall eating quality of the processed oatmeal has not been sufficient for consumer acceptance.

The ready to eat oatmeal product of the present invention is not subject to any of the above-listed disadvantages, and is a new and improved oatmeal product that has very good eating quality after processing for sale in ready to eat form in cup-like containers, jars or the like.

BRIEF SUMMARY OF THE INVENTION

In accordance with the methods of the present invention, thick cut oats are used which are processed either by bumping or rolling so that they will maintain their integrity during the processing of the oatmeal product.

Second, fruit and/or fruit juice are mixed with the processed oats so that the product has high acid and low pH, thereby requiring less heat in processing to kill bacteria. The lower heat and pressure in processing also prevents the deterioration of the integrity of the oats in the product.

Third, because less heat is required in processing, the oatmeal product of the present invention can be pasteurized instead of being retorted under high heat and pressure, thereby resulting in a much better eating quality of the prepared, ready to eat oatmeal product.

The method of preparation of the oatmeal product of the present invention generally comprises adding to a processing receptacle a mixture of acid, salt, fruit juice concentrate, sweetener and water; heating and agitating the mixture at a temperature of about 120° F. to 140° F. for a predetermined time period; adding a predetermined amount of thick cut oats and the heated and agitated mixture to a serving container such as a cup, jar or the like; sealing, pasteurizing and cooling the filled container. Optionally, a flavor or plant sterol may be added to the mixture in the processing receptacle before heating and agitating the mixture; and a diced fruit may be added to the container before it is sealed.

DESCRIPTION OF THE PREFERRED EMBODIMENTS

The new and improved method of the present invention generally comprises the following steps:

1 Adding an appropriate acid and salt to a processing receptacle or the like;

2. Adding suitable fruit juice concentrate and sweetener to the receptacle;

3. Adding formula water to the receptacle and heating the mixture to a temperature of 120° F. to 140° F. with agitation for a predetermined period of time (approximately 20-25 minutes);

4. Optionally adding a flavor or other product, such as a plant sterol to the mixture before it is heated and agitated;

5. Adding a predetermined amount of dry thick cut oats and the heated and agitated mixture to a serving container such as a cup, jar or the like.

6. Optionally adding a diced fruit to the serving container.

7. Pasteurizing the filled and sealed serving container for a predetermined period of time (approximately 40-45 minutes) in a boiling water bath, tunnel pasteurizer or the like; and 8. Cooling the serving container to ambient temperature.

The acid may be lactic acid, ascorbic acid and/or citric acid. The acid may be approximately 0.15 to 0.35% by weight of the total ingredients in the filled container.

The salt may be approximately 0.04 to 0.07% by weight of the total ingredients in the filled container.

The fruit juice concentrate may be any suitable concentrate such as pear juice or apple juice concentrate, and may be approximately 9 to 11% by weight of the total ingredients in the filled container.

The sweetener may be any suitable sweetener such as liquid sugar, and maybe approximately 6 to 10% by weight of the total ingredients in the filled container.

The water may be approximately 50 to 60% by weight of the total ingredients in the filled container.

The flavor may be any suitable flavor such as vanilla cream or cinnamon, and may be approximately 0.05 to 0.50% by weight of the total ingredients in the filled container.

A phytosterol (plant sterol) may be added as an ingredient to help lower cholesterol, and maybe approximately 0.5 to 0.7% by weight of the total ingredients in the filled container.

The oats may be any suitable type of dry oats, such as bumped or extra thick rolled oats having a preferred thickness greater than 0.032 inches and may be approximately 9 to 11% by weight of the total ingredients in the filled container.

The fruit may be any suitable diced fruit such as peaches or apples, and may be approximately 13 to 16% by weight of the total ingredients in the filled container.

The following Examples I, II and III set forth specific ingredients and percent by weight for an oats peach product and two oats apple cinnamon products in accordance with the present invention. It is noted that these specific Examples are merely illustrative of some embodiments of the present invention which is not intended to be limited thereto and is intended to cover various modifications and other ingredients and methods of preparation that would fall within the spirit and scope of the present invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

Example I

Oats Peach Product

| Component | Wgt. Percent |
|---|---|
| Water | 54.81% |
| Peaches, diced in juice | 15.00% |
| Thick Cut Oats | 10.56% |
| Pear Juice Concentrate | 10.00% |
| Liquid Sugar | 9.17% |
| Lactic Acid | 0.19% |
| Vanilla Cream Flavor | 0.11% |
| Ascorbic Acid | 0.06% |
| Citric Acid | 0.06% |
| Salt | 0.04% |
| Total | 100.00% |

Example II

Oats Apple Cinnamon Product (1)

| Component | Wgt. Percent |
|---|---|
| Water | 56.73% |
| Apples, diced in water | 15.00% |
| Apple Juice Concentrate | 10.28% |
| Thick Cut Oats | 10.28% |
| Liquid Sugar | 7.22% |
| Lactic Acid | 0.19% |
| Cinnamon, ground B | 0.14% |
| Ascorbic Acid | 0.06% |
| Citric Acid | 0.06% |
| Salt | 0.04% |
| Total | 100.00% |

Example III

Oats Apple Cinnamon Product (2)

| Component | Wgt. Percent |
|---|---|
| Water | 56.04% |
| Apples, diced in water | 15.01% |
| Apple Juice Concentrate | 10.28% |
| Thick Cut Oats | 10.28% |
| Liquid Sugar | 7.23% |
| Lactic Acid | 0.19% |
| Plant Sterols | 0.67% |
| Cinnamon, ground B | 0.14% |
| Ascorbic Acid | 0.06% |
| Citric Acid | 0.06% |
| Salt | 0.04% |
| Total | 100.00% |

What is claimed is:

1. A method of producing a ready to eat oatmeal product for consumption in a container of a desired size, comprising:
   adding to a processing receptacle a mixture of acid, salt, fruit juice concentrate, sweetener and water;
   heating and agitating said mixture at a temperature of approximately 120° F. to 140° F. for a predetermined time period;
   adding a predetermined amount of uncooked dry thick cut oats and the heated and agitated mixture to the container;
   sealing the filled container and pasteurizing it for a predetermined time period; and
   cooling the sealed container to ambient temperature.

2. The method of claim 1 wherein the acid and salt are added to the processing receptacle before the fruit juice concentrate and the sweetener, and the water is added after the fruit juice concentrate and sweetener.

3. The method of claim 2 wherein fruit is added to the container before it is sealed.

4. The method of claim 3 wherein the fruit is diced.

5. The method of claim 1 wherein a flavor is added to the processing receptacle before the mixture is heated and agitated.

6. The method of claim 1 wherein a plant sterol is added to the processing receptacle before the mixture is heated and agitated.

7. The method of claim 1 wherein the mixture is heated and agitated in the processing receptacle for a period of approximately 20 to 25 minutes.

8. The method of claim 1 wherein the sealed container is pasteurized for a period of approximately 40 to 45 minutes.

9. The method of claim 1 wherein the uncooked dry thick cut oats are added to the container before the heated and agitated mixture.

10. The method of claim 1 wherein the sealed container is pasteurized in a tunnel pasteurizer or a boiling water bath.

11. The method of claim 1 wherein the acid is lactic acid, ascorbic acid and/or citric acid; the fruit juice concentrate is pear or apple juice; and the sweetener is liquid sugar.

12. The method of claim 5 wherein the flavor is vanilla cream or cinnamon.

13. The method of claim 3 wherein the fruit is diced peaches or apples.

14. The method of claim 3 wherein the contents of the sealed container by weight % are approximately water: 50-60%, fruit: 13-16%, oats: 9-11%, fruit juice concentrate: 9-11%, salt: 0.04-0.07%, sweetener: 6-10%, and acid: 0.15-0.35%.

15. The method of claim 14 wherein flavor is added to the processing receptacle before the mixture is heated and agitated, and the flavor is approximately 0.05% to 0.50% by weight of the contents of the sealed container.

16. The method of claim 15 wherein the flavor is vanilla cream or cinnamon.

17. The method of claim 14 wherein a plant sterol is added to the processing receptacle before the mixture is heated and agitated, and the plant sterol is approximately 0.5-0.7% by weight of the contents of the sealed container.

18. The method of claim 3 wherein the acid is lactic acid, ascorbic acid and/or citric acid; the fruit juice concentrate is pear juice; the sweetener is liquid sugar; and the fruit is diced peaches.

19. The method of claim 18 wherein a vanilla cream flavor is added to the processing receptacle before the mixture is heated and agitated.

20. The method of claim 3 wherein the acid is lactic acid, ascorbic acid and/or citric acid; the fruit juice concentrate is apple juice; the sweetener is liquid sugar; and the fruit is dried apples.

21. The method of claim 19 wherein cinnamon is added to the processing receptacle before the mixture is heated and agitated.

22. The method of claim 1 wherein the thick cut oats are bumped or rolled oats having a thickness greater than about 0.032 inches.

* * * * *